Jan. 17, 1928.　　　　　C. H. ROTH　　　　　1,656,870
VULCANIZING APPARATUS
Filed Sept. 17, 1925
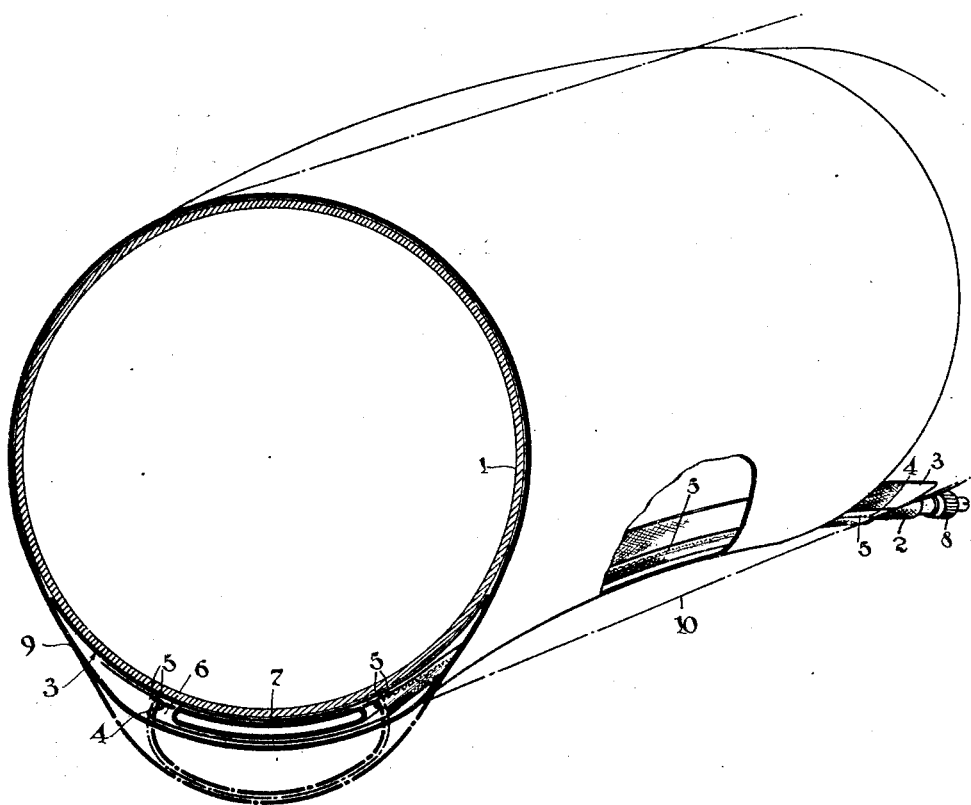
INVENTOR
Charles H. Roth,
BY　R.O. Trogner
ATTORNEY Patented Jan. 17, 1928.

1,656,870

UNITED STATES PATENT OFFICE.

CHARLES H. ROTH, OF AKRON, OHIO, ASSIGNOR TO THE GOODYEAR TIRE & RUBBER COMPANY, OF AKRON, OHIO, A CORPORATION OF OHIO.

VULCANIZING APPARATUS.

Application filed September 17, 1925. Serial No. 56,951.

My invention relates to apparatus adapted to be employed in the manufacture of resilient tubular articles and it has particular relation to vulcanizing apparatus designed for the purpose of facilitating the removal of inner tubes for pneumatic tires therefrom after the vulcanizing process has been completed.

The object of my invention is to provide an apparatus for vulcanizing resilient tubular articles which is so constructed that the circumference thereof is adapted to be varied in order to permit the tubular members to become loosened and stripped from the apparatus without subjecting the tube to objectionable distortion.

In the manufacture of tubular rubber articles, such as inner tubes used in automobile tires, it has been customary to roll or wind a strip of raw rubber stock upon a straight cylindrical mandrel and secure the edges of the stock by compressing such edges together or by means of fabric wrappings. The assembled mandrel and rubber stock is then placed within a heater in order to vulcanize the rubber. Another well known method of manufacturing inner tubes consists of applying rubber stock upon a circular mandrel of substantially the same shape as the finished inner tube is to assume, and vulcanizing the stock upon the circular mandrel in a suitable heater. Whether the rubber stock is vulcanized or cured upon a straight or circular mandrel, manufacturers heretofore have experienced difficulty in removing the vulcanized tube from the mandrel, this step in the manufacture being especially difficult in the case of removing cured tubes from circular mandrels. This is because the tubes being stripped from the circular mandrel are subjected to considerable stretching and distortion which is likely to injure the tube permanently.

It is the primary aim of my invention to provide means whereby rubber tubes cured upon a straight or circular mandrel may be stripped therefrom without subjecting the cured rubber to the objectionable stresses which tend to distort and injure the tube. An apparatus embodying my invention consists generally of a rigid core or mandrel which is provided with a pneumatically inflatable member secured longitudinally thereof, in the event that a straight mandrel is employed, or circumferentially thereof, in the event that a circular member is employed. My invention involves the provision of novel means for maintaining the inflatable member in proper position on the mandrel and for limiting the expansion of this member. Before the rubber stock is applied to the mandrel the pneumatic member is inflated and after the curing process has been completed, the pneumatic member is deflated, thereby relieving any tension upon the cured tube and permitting it to be easily stripped from the mandrel.

For a better understanding of my invention, reference may now be had to the accompanying drawing forming a part of this specification, the figure of which illustrates partly in cross-section and partly in elevation, the vulcanizing apparatus embodying my invention.

In practising my invention I provide a rigid curved core 1 which forms the major portion of my vulcanizing apparatus. This core is preferably constructed of metal, but it is apparent that any other suitable rigid material may be employed, and that the member may be either hollow or solid, without departing from the spirit of my invention. At the inner circumferential surface of the curved core I provide a fabric casing 2 which is composed of a strip of fabric 3, cemented or glued to the rigid core 1, and a second strip of fabric 4 stitched longitudinally along the outside surface of the strip 3, as indicated at 5.

It will be observed that the fabric strip 3 fits snugly against the core 1 while the fabric strip 4 is so stitched that considerable slack is permitted therein in order to provide a space 6 which is adapted to receive a pneumatic rubber pad 7. As the fabric strips 3 and 4 are substantially inextensible, the rubber pad is permitted to expand only a limited degree determined by the amount of slack in the fabric strip 4. This prevents any tendency toward overinflation and consequent rupture of the rubber pad 7. One end of the pad 7 is provided with a valve 8 through which the pad is inflated and deflated.

After the pad 7 has been secured in proper position within the casing 2 and the pad has been inflated to the size indicated in dot and dash lines, rubber tube stock 9 is wrapped about the core and the casing as a unit, and the whole assembly is then placed within a suitable vulcanizing heater, (not shown). When the vulcanizing process has been completed, the apparatus is removed from the heater and the valve 8 is opened to deflate the pad 7. It will be apparent that the cured tube 9, is thus relieved of any tension and that it is loosely disposed about the apparatus. Consequently it may be stripped from the mandrel without difficulty and without subjecting it to material stretching or distortion.

In the event that it is desirable to employ a straight mandrel instead of a curved one, the principles of operation and the structure of the apparatus will be substantially the same as in the case of the apparatus described in the foregoing paragraphs. As indicated by dot and dash lines 10 in the figure shown in the drawings, a straight mandrel may be employed. As the changes in structure from the curved mandrel to the straight mandrel are obvious, a further description of the straight mandrel 10 is not necessary.

Although I have illustrated but one preferred form which my invention may assume and have described in detail but a single application thereof, it will be apparent to those skilled in the art that the invention is not so limited but that various minor modifications and changes may be made therein without departing from the spirit of my invention or from the scope of the appended claims.

What I claim is:

1. A vulcanizing apparatus for inner tubes comprising an arcuate mandrel and an elongate inflatable member secured to the mandrel substantially along the line of shorter circumferential length thereof.

2. A vulcanizing apparatus for inner tubes comprising a mandrel, an elongate inflatable member and an envelope for connecting the inflatable member to the mandrel.

3. A vulcanizing apparatus for inner tubes comprising a mandrel, an elongate rubber pad and an elongate fabric casing enveloping the rubber pad and cemented to the mandrel.

4. A vulcanizing apparatus comprising a mandrel, a fabric envelope secured along one side to said mandrel, and an inflatable member disposed within said envelope.

5. The combination with an elongate mandrel, of a relatively small elongate pneumatic pad positioned longitudinally of the mandrel and a pair of flexible strips arranged on opposite sides of the pad and secured to the mandrel.

6. A method of manufacturing inner tubes that comprises wrapping a layer of rubber stock about a mandrel, imposing pneumatic pressure to space a longitudinal portion of the rubber stock from the mandrel, curing the rubber stock while so spaced and relieving the pneumatic pressure to facilitate stripping of the inner tube from the mandrel.

In witness whereof, I have hereunto signed my name.

CHARLES H. ROTH.